(12) United States Patent
Dabsch et al.

(10) Patent No.: US 10,845,217 B2
(45) Date of Patent: Nov. 24, 2020

(54) SENSOR FOR DETERMINING AN ANGLE OF ROTATION

(71) Applicant: TECHNISCHE UNIVERSITAET WIEN, Vienna (AT)

(72) Inventors: Alexander Dabsch, Vienna (AT); Franz Keplinger, Vienna (AT); Andreas Kainz, Vienna (AT)

(73) Assignee: TECHNISCHE UNIVERSITAET WIEN, Vienna (AT)

( * ) Notice: Subject to any disclaimer, the term of this patent is extended or adjusted under 35 U.S.C. 154(b) by 0 days.

(21) Appl. No.: 15/776,676

(22) PCT Filed: Nov. 17, 2016

(86) PCT No.: PCT/AT2016/060112
§ 371 (c)(1),
(2) Date: May 16, 2018

(87) PCT Pub. No.: WO2017/083898
PCT Pub. Date: May 26, 2017

(65) Prior Publication Data
US 2018/0372515 A1     Dec. 27, 2018

(30) Foreign Application Priority Data

Nov. 17, 2015  (AT) .............................. A 50978/2015

(51) Int. Cl.
*G01D 5/34*      (2006.01)
*G01B 11/26*     (2006.01)
(52) U.S. Cl.
CPC .............. *G01D 5/34* (2013.01); *G01B 11/26* (2013.01)
(58) Field of Classification Search
CPC .. G01D 5/34; G01D 5/30; G01D 5/32; G01D 5/35341; G01B 11/26; G01B 21/22
(Continued)

(56) References Cited

U.S. PATENT DOCUMENTS

| 3,351,767 A | 11/1967 | Suiter |
| 8,531,627 B2 * | 9/2013 | Hamada ................. G02B 30/25 349/76 |

(Continued)

FOREIGN PATENT DOCUMENTS

| DE | 128 46 44 | 12/1968 |
| DE | 196 21 188 | 11/1997 |

(Continued)

OTHER PUBLICATIONS

PCT Search Report and IPER in PCT/AT2016/060112.

*Primary Examiner* — Seung C Sohn
(74) *Attorney, Agent, or Firm* — Greenblum & Bernstein, P.L.C.

(57) ABSTRACT

Sensor for determining a rotation angle (θ) about a rotation axis. The sensor includes a rotary element mounted in a base element so as to be rotatable about the rotation axis. The rotary element is made from a first material having a first refractive index n1 and is constructed from several layers. At least one light generating device is fixedly arranged relative to the base element. At least one light detection device is fixedly arranged relative to the base element and configured to detect a light signal. At least one refractive structure is arranged in each layer and has a second refractive index n2, wherein n2≠n1. The at least one beam path extends at least in a first rotation angle range through the at least one refractive structure in order to be able to assign a specific rotation angle (θ) to the light signal detected by the at least one light detection device at least in the first rotation angle range.

21 Claims, 4 Drawing Sheets

(58) Field of Classification Search
USPC .................................... 250/231.13–231.18
See application file for complete search history.

(56) References Cited

U.S. PATENT DOCUMENTS

| | | |
|---|---|---|
| 9,488,499 B2 | 11/2016 | Mutschler |
| 2015/0366489 A1 | 12/2015 | Von Marcard |
| 2016/0084677 A1* | 3/2016 | Petschik ............ G01D 5/34715 |
| | | 250/231.13 |

FOREIGN PATENT DOCUMENTS

| | | |
|---|---|---|
| DE | 100 25 410 | 12/2001 |
| DE | 10 2012 205 380 | 10/2013 |
| DE | 10 2012 012 695 | 1/2014 |
| EP | 2 693 166 | 2/2014 |

\* cited by examiner

SENSOR FOR DETERMINING AN ANGLE OF ROTATION

FIELD OF THE INVENTION

The present invention relates to a sensor for determining a rotation angle about a rotation axis, the sensor comprising a rotary element which is mounted in a base element so as to be rotatable about the rotation axis and is produced from a first material having a first refractive index n1, wherein at least one light generating means is provided which is fixedly arranged relative to the base element and at least one light detection means which is fixedly arranged relative to the base element to detect a light signal emitted by the at least one light generating means and passed through the rotary element along at least one beam path.

DESCRIPTION OF THE PRIOR ART

In different fields of technology it is necessary to be able to determine rotation angles precisely. For example, there are numerous applications in the automotive industry for corresponding angle sensors, e.g. to determine the positioning of steering columns, in headlight controls or generally to control the used servomotors. But in other areas, such as in aerospace, the measurement of rotation angles is necessary, for example, to determine a rotation angle of a propulsion unit axis.

Known systems work partly with encoder discs or magnetic sensors, resulting in a number of disadvantages. In addition to a correspondingly complicated construction, the necessity of having to approach a reference point is disadvantageous in many systems, since purely static angle measurements are therefore not possible.

Furthermore, the use of magnetic sensors is excluded in a variety of applications in which external magnetic influences are present and would inadmissibly distort the measurement result. For aerospace applications in particular, such angle sensors can therefore be ruled out.

Finally, in known systems, complicated structures with multiple sensors are used to prevent fluctuations in the power supply which would lead to a falsified measurement result. The use of such systems is correspondingly expensive. In addition, the space requirement increases and thus prevents a desired miniaturization for many applications.

SUMMARY OF THE INVENTION

It is therefore an object of the present invention to provide a sensor for determining a rotation angle about a rotation axis, which avoids the above-mentioned disadvantages. In particular, the sensor should allow static angle measurements and be insensitive to magnetic influences. Preferably, the sensor according to the invention should be insensitive to fluctuations in the power supply. Particularly preferably, the sensor according to the invention should be miniaturizable.

PRESENTATION OF THE INVENTION

The present invention is based on an optical angle sensor, wherein a beam path between a light generating means and a light detection means, which serves to detect the light generated by the light generating means, leads through a rotary element which is rotatably mounted about a rotation axis in order to determine a rotation angle of the rotary element about the rotation axis. In this case, a refractive structure is provided according to the invention in the rotary element, which is arranged an least in a certain rotation angle range in the beam path to refract the light as a function of the actual rotation angle and thus to influence it, in particular in that a reflection or transmission change is produced. The refractive structure accordingly has a different refractive index than the rest of the rotary element.

The influence of the light as a function of the rotation angle is determined by the specific geometric configuration of the refractive structure and by its arrangement in the rotary element and can be calculated by means of the well-known laws of optics, e.g. cf. Novotny and B. Hecht, "Principles of Nano-Optics", Cambridge university Press, 2nd Ed., 2012, ISBN 10: 1107005469. The influence on the light by the refractive structure can be calculated for each rotation angle in that the refractive structure is provided with a particular desired shape and by arranging it in the rotary element in a defined manner. This principle allows static single measurements without the need to approach a reference point before the measurement.

Therefore, it is provided according to the invention in a sensor for determining a rotation angle about a rotation axis, which sensor comprises a rotary element rotatable in a base element about the rotation axis, said rotary element being made from a first material having a first refractive index n1, wherein at least one light generating means is provided which is fixedly arranged relative to the base element and at least one light detection means which is fixedly arranged relative to the base element to detect a light signal emitted by the at least one light generating means and passed through the rotary element along at least one beam path, that at least one refractive structure is provided in the rotary element, which has a second refractive index n2, wherein $n2 \neq n1$, preferably $n2 < n1$, applies, and wherein the at least one beam path extends at least in a first rotation angle range through the at least one refractive structure in order to be able to assign a specific rotation angle to the light signal detected by the at least one light detection means at least in the first rotation angle range.

The refractive structure is thus substantially surrounded by the first material with the refractive index n1, wherein the refractive structure is arranged fixed relative to the first material or to the remaining rotary element. Therefore, the shape and the arrangement of the refractive structure, particularly in a plane in which the light generating means and the light detection means are arranged, determine the light signal detected by the at least one light detection means depending on the rotation angle.

The beam path extends at least in the first rotation angle range in sections in the refractive structure or crosses them. In other words, the light, generally in the rotary element, enters the refractive structure at one location and leaves it at another location, generally also in the rotary element.

The refractive structure arranged in the rotary element or in the first material thus defines a rotation-dependent transfer function for the property of interest of the light.

In order to account for variations in the properties of the light emitted by the light generating means due to fluctuations in the power supply of the light generating means, it is provided in a preferred embodiment of the sensor according to the invention that at least one reference light detection means is provided to detect light emitted by the at least, one light generating means even before this light impinges on the at least one refractive structure, preferably on the rotary element. This means that with the reference light detection means the property of interest of the light is substantially measured, without this property having been changed by the refractive structure. Preferably, the sensor is designed so that the light from the reference light detection means is detected in such a way as emitted by the light generating means.

The light detected by the light detection means can thus be set in relation to the measurement result of the reference light detection means, thereby preventing variations in the characteristics of the emitted light caused by the light generating means itself from falsifying the result for the rotation angle.

In particular, intensity fluctuations of the light emitted by the light generating means can be compensated in this way. This means that by means of the reference light detection means, a measure is continuously determined for the intensity of the light generating means or for an output intensity of the light emitted by the light generating means. The intensity measured by the light detection means is placed in relation to the output intensity or this measure. The obtained ratio is independent of fluctuations in the intensity of the light generating means, which fluctuations can occur for example due to supply voltage fluctuations. It is understood that with a plurality of light generating means at least a separate reference light detection means may be provided for each of them.

Typically, the refractive structure causes a reflection and/or transmission change in the beam path when the rotation angle changes or when the refractive structure ensures that at least in a certain first rotation angle range each transmission value can be assigned a certain rotation angle. Accordingly, the resulting transfer function can be calculated directly as a transmittance from the well-known Fresnel formulas (see L. Novotny and B. Hecht, "Principles of Nano-Optics", Cambridge University Press, 2nd ed., 2012, ISBN 10: 1107005469), if the geometry of the refractive structure as well as n1 and n2 are known. It is therefore provided in a preferred embodiment of the sensor according to the invention that the at least one light detection means is designed for determining the light intensity. This type of detection is technically particularly easy to implement, wherein a wealth of known detectors can be used as a light detection means. In this case, the selection of the detector is made in particular with regard to the wavelength used or to the wavelength range used. Analogously, it is provided in a preferred embodiment of the sensor according to the invention that the at least one reference light detection means is designed to determine the light intensity.

It should be noted, however, that by means of the refractive structure in principle also a transfer function for other properties of the light can be defined, e.g. for a rotation-angle-dependent phase shift.

In order to realize a structurally particularly simple arrangement, it is provided in a preferred embodiment of the sensor according to the invention that the at least one light generating means and the at least one light detection means are arranged opposite each other, wherein the rotation axis is arranged between the at least one light generating means and the at least one light detection means. In this case, the light generating means and the light detection means are preferably arranged in a plane normal to the rotation axis, or the beam path is preferably in this plane.

In order to be able to produce the refractive structure with a refractive index n2 which is different from n1 in a simple and accurate manner and with high reproducibility, it is provided in a preferred embodiment of the sensor according to the invention that the at lease one refractive structure is formed by a recess in the first material of the rotary element. At wavelengths greater than those in the X-ray range, n2<n1 can be ensured in a structurally simple manner in this way.

In order to be able to produce the recess inexpensively and with a well-proven method, it is provided in a particularly preferred embodiment of the sensor according to the invention that the at least one refractive structure is etched into the first material of the rotary element. This established method offers a particularly high accuracy and a particularly high reproducibility for producing the desired refractive structure. Furthermore, very small refractive structures can thus be generated in a defined manner—possibly also in the micrometer range or submicrometer range—which favors the miniaturization of the sensor according to the invention.

In particular, in order to be able to use well-established etching processes for producing the desired refractive structure, it is provided in a preferred embodiment of the sensor according to the invention that the first material is a Si material or a glass material. In this case, Si material is to be understood as meaning Si-based materials, in particular Si wafers and substrates, i.e. it does not have to be pure Si. Glass material means materials based on glass, in particular glass wafers and substrates. The aforementioned Si and glass materials may in particular be doped materials, wherein it is possible for the doping to specifically influence the refractive index n1. In general, by appropriate choice of the first material, the refractive index n1 can be selectively varied, which—in addition to the geometry of the refractive structure—can be used for the design of the transfer function.

It should be emphasized that the at least one refractive structure can not only be formed as a recess. For example, it is conceivable that the at least one refractive structure consists of a Si material or a glass material. In order to influence the refractive index of these materials specifically, and thus to achieve a desired value for n2, the Si material and/or the glass material, which are provided for the at least one refractive structure, can also be doped specifically. Furthermore, it is conceivable to produce the at least one refractive structure directly in the rotary element, which is made of a Si material or a glass material, by doping a desired section of the rotary element. In this case, the refractive structure can generally also be formed in that it has a different doping than the first material or as the remaining rotary element. Accordingly, the first material surrounding the refractive structure could also be doped to produce the refractive structure.

In order to ensure a certain redundancy of the measurement of the rotation angle with only a single sensor according to the invention, it is provided in a preferred embodiment of the sensor according to the invention that the rotary element, as seen along the rotation axis, is designed of several layers, wherein in each layer at least one refractive structure is provided. This means that in each layer at least one refractive structure is present, for example by exactly one refractive structure being provided in each layer. However, it is also possible for a plurality of refractive structures to be provided in at least one of the layers. Accordingly, to ensure a redundant measurement, only a single layer can be provided, in which a plurality of refractive structures are arranged.

In addition to ensuring redundancy, the measuring range or the measurable angular range can be extended in this way in that the refractive structures are each offset by a certain rotation angle in the rotary element. This staggered arrangement for extending the measuring range is also possible in principle in a single layer. However, in order to ensure that the structure is particularly easy to manufacture and a particularly wide measuring range is obtained, it is provided in a particularly preferred embodiment of the sensor according to the invention that the refractive structures of different layers are arranged to each other such that the beam paths in different rotational angle ranges extend through these refractive structures, wherein the different rotational angle ranges preferably overlap in sections. The latter ensures that the resulting measuring range is continuous and has no gaps. The different beam paths include the individual beam paths in the respective layers.

To illuminate all layers, multiple light generating means may be provided, ideally one per layer. Alternatively, if is provided in a particularly inexpensive embodiment of the sensor according to the invention that a light generating means is provided for a plurality of, preferably for all, layers. For this purpose, a laser diode or a light-emitting diode, for example, can be selected as a light generating means, whose dimensioning along the rotation axis is selected such that it or the light emitted by if covers or illuminates all layers at least in sections.

For easy measurement or detection of the light of all beam paths, at least one light detection means may be provided for each layer. If the transfer functions of the individual refractive structures are known, this results in a total transfer function for the entire measurable angular range. This overall transfer function can be designed so that the knowledge of this total transfer function ensures that only one light detection means can be provided for the corresponding measurement. This means that based on the measurement result of this light detection means, the rotation angle can be determined by calculation using the overall transfer function. Therefore, it is provided in a preferred embodiment of the sensor according to the invention that a light detection means is provided for a plurality of, preferably for all layers.

In a preferred embodiment of the sensor according to the invention it is provided that the rotary element comprises a first part and a second part, wherein the first part has a first section of the at least one refractive structure and the second part has a second section of the at least one refractive structure, and that the first part and the second part are joined, wherein the first section and the second section are connected and form the at least one refractive structure. The first part and the second part may also form a layer of the rotary element in a multilayer construction of the rotary element or one or more layers of the rotary element may be constructed from a respective first and a second part. This type of construction with first and second part is particularly interesting in terms of manufacturing technology, if the refractive structure is designed as a recess in the first material. By joining the first part and the second part, an outwardly closed cavity or a closed refractive structure cast be formed in this way. Particularly preferably, the respective sections of the refractive structure are etched into the first part and the second part. Preferably, the sections of the refractive structure are formed symmetrically.

In order to be able to easily distinguish signals from different light generating means, it is provided in a preferred embodiment of the sensor according to the invention that a plurality of light generating means is provided, wherein the wavelength of the light which can be emitted by one of the light generating means differs from the wavelength of the light which can be emitted by another of the light generating means. For example, one light generating means is designed to emit blue light, whereas another light generating means is designed for the emission of infrared light. The different wavelengths allow easy assignment to the respective light generating means or to the respective beam paths. This can be used to easily perform selectively redundant measurements or to easily assemble multiple rotation angle ranges to a large angular range.

Accordingly, it is provided in a preferred embodiment of the sensor according to the invention that the at least one light detection means is designed for wavelength-dispersive light detection, preferably by providing for each light generating means of a specific wavelength a separate light detection means which is sensitive to the specific wavelength. Theoretically, of course, a single energy- or wavelength-dispersive detector would also be conceivable in which several photodiodes are integrated for example, each working in a different wavelength range, or is designed as a wavelength-dispersive CCD sensor.

A variety of known light sources are available as light generating means, in particular light-emitting diodes or laser diodes, which allow a miniaturization of the sensor. The light sources may emit light preferably at a desired wavelength or in a desired wavelength range. In particular, it is not necessary that the generated light must be in the optically visible wavelength range. It may, for example, also be shorter-wave light or longer-wave light, in particular light in the infrared range. Accordingly, in a preferred embodiment of the sensor according to the invention it is provided that the at least one light generating means concerns at least one laser diode.

The choice of the light detection means depends in particular on the property change of the light which is to be detected and which is caused by the refractive structure as a function of angle. Furthermore, the wavelength or the wavelength range of the light to be detected plays a role in the selection of the light detection means. In particular with regard to a simple and cost-effective solution, it is provided in a preferred embodiment of the sensor according to the invention that the at least one light detection means concerns at least one photodiode. Analogously, it is provided in a preferred embodiment of the sensor according to the invention that the at least one reference light detection means concerns at least one photodiode. According to the above, CCD sensors, scintillation counters, photomultipliers etc. can be used depending on the application and the wavelength of the light as alternative light detection means or reference light detection means.

The transfer function is essentially determined by the geometry of the refractive structure. A "simple" geometry does not necessarily result in a "simple" functional relationship between the property of interest of the detected light and the rotation angle. A geometry that is particularly easy to produce is that of a straight line. Accordingly, in a preferred embodiment of the sensor according to the invention, it is provided that the at least one refractive structure extends along a line in a plane normal to the rotation axis, wherein the line preferably has zero curvature, i.e. the course of the refractive structure is connected along the line.

However, the transmittance resulting for a rectilinear refractive structure is not a linear function of the rotation angle but is nonlinear. However, if a linear or otherwise desired function for the transmittance or generally for the transfer function is to be realized, this transfer function or this functional relationship can be predetermined and the geometry of the refractive structure to be produced can be recalculated or adapted by means of simulation. Accordingly, it is provided in a particularly preferred embodiment of the sensor according no the invention that the line has such a curvature that at least in the first rotation angle range a specific transfer function, preferably a linear transfer function, between the light signal detectable with the at least one light detection means and the rotation angle is given.

Due to imperfections in the fabrication process for the refractive structure, the resulting transfer function may vary from the theoretical to some extent. To take this circumstance into account, the transfer function can be determined after the production of the sensor by measurement and stored in a memory designated for this purpose. Thus, a reliable static measurement is made possible also in this case, since the light signal detected by the light detection means—or possibly its ratio with the light signal detected by the reference light detection means—can be compared with the transfer function stored in the memory to determine the associated rotation angle. Accordingly, a device is provided according to the invention which comprises at least one sensor according to the invention, wherein a memory is provided in which at least for the first rotation angle range a transfer function generated by the at least one refractive structure between the light signal detectable by the at least one light detection means and the rotation angle is stored.

Due to the purely optical operating principle, the sensor according to the invention or the device according to the invention is fundamentally completely immune to external magnetic influences. This enables applications in space travel, in particular for controlling or checking satellite engine actuators. Therefore, according to the invention, a satellite engine actuating device is provided, comprising a sensor according to the invention or a device according to the invention.

The sensor according to the invention or the device according to the invention preferably serves to determine the rotation angle of a satellite engine axis. For this purpose, the satellite engine axis can be connected directly to the rotary element in a rotationally fixed manner or via a transmission. Accordingly, a satellite is provided according to the invention, comprising a satellite engine and a satellite engine actuating device according to the invention, wherein a satellite engine axis of the satellite engine is connected in a torque-proof manner or via a transmission to the rotary element.

BRIEF DESCRIPTION OF THE DRAWINGS

The invention will now be explained in more detail with reference to embodiments. The drawings are provided by way of example and are intended to explain the concept of the invention, but shall in no way restrict it or even render it conclusively, wherein:

FIG. 3b shows a schematic representation of a sectional view of the rotary element of FIG. 3a;

DETAILED DESCRIPTION OF THE PREFERRED EMBODIMENTS

Figure 1:
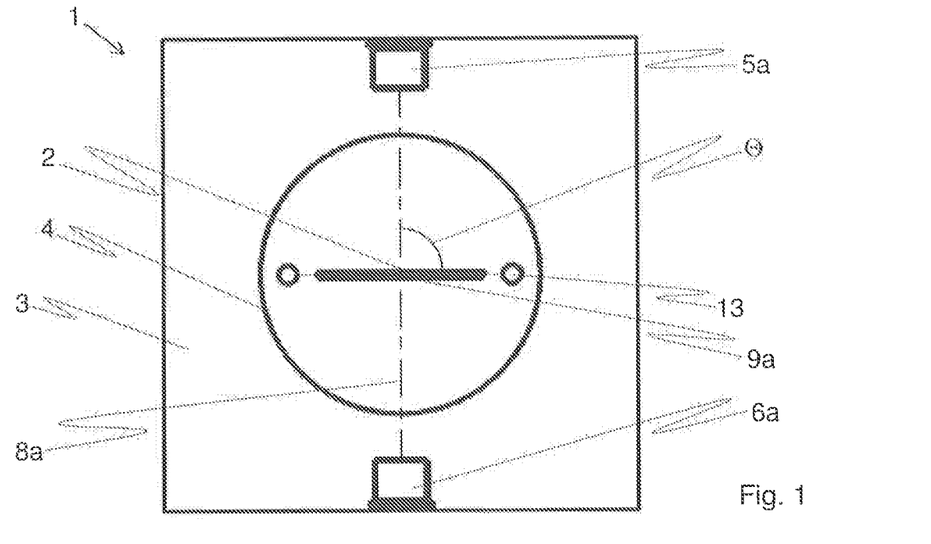
FIG. 1 shows a schematic representation of a sensor according to the invention in plan view.

FIG. 1 shows schematically the basic construction of an exemplary embodiment of a sensor 1 according to the invention for determining a rotational angle θ about a rotation axis 2. For this purpose, a rotary element 4 is provided, which is rotatably mounted about the rotation axis 2 in a base element 3, which can be designed as a housing, i.e. the rotation angle θ of the rotary element 4 is ultimately determined.

The sensor 1 according to the invention operates purely optically, i.e., the sensor 1 does not require any magnetic field sensors for determining the rotation angle θ and the sensor 1 is also insensitive to external magnetic influences.

The sensor 1 has a light source or a light generating means, which is preferably formed in the illustrated embodiments as a laser diode 5a. The laser diode 5a emits light having a known (output) intensity $I_0$. The laser diode 5a is fixedly arranged in this ease relative to the base element 3 so that it emits light in the direction of the rotary element 4. In order to detect the light emitted by the laser diode 5a, a light detection means is provided, which in the exemplary embodiments shown is preferably designed as a photodiode 6a. In this case, the photodiode 6a is sensitive to the wavelength or the wavelength range of the light of the laser diode 5a.

In the exemplary embodiment shown, the photodiode 6a is arranged exactly opposite the laser diode 5a, wherein the rotation axis 2 is arranged between the laser diode 5a and the photodiode 6a. Preferably, the arrangement of the laser diode 5a and the photodiode 6a is symmetrical about a plane of symmetry in which the rotation axis 2 extends.

According to this arrangement, the light emitted by the laser diode 5a passes along a beam path 8a through the rotary element 4 before striking the photodiode 6a. The rotary element 4 is made of a first material which has a refractive index n1 which, depending on the wavelength of the light and the specific first material, can typically be in a range from 1 to 7, preferably from 1 to 4, particularly preferably from 3 to 4. In the rotary element 4, a refractive structure 9a is arranged, which has a refractive index n1, wherein n2≠n1, preferably n2<n1, applies. Depending on the wavelength of the light and the specific material of the refractive structure 9a, n2 can typically likewise be in the value ranges mentioned above for n1. At least in a first rotation angle range, the beam path 8a extends through the refractive structure 9a, as shown in FIG. 1.

The refractive structure 9a causes a reflection or transmission change of the light detected by the photodiode 6a as a function of the rotation angle θ. This dependence is due to the geometric shape of the refractive structure 9a, which extends in the embodiment of FIG. 1 along a straight line. At different rotation angles θ, the light is refracted differently by the refractive structure 9a and the transmission changes. The refractive structure 8a thus defines a transfer function for the light intensity or the transmittance t, which can be determined mathematically for each rotation angle θ with the aid of the Fresnel formulas with known geometry of the refractive structure 9a—and with specific refractive indices n1, n2 and a specific wavelength of light –, cf. L. Novotny and B. Hecht, "Principles of Nano-Optics," Cambridge University Press, 2nd Ed., 2012, ISBN 10: 1107005469.

This means that by determining the transmission or the intensity of the light with the photodiode 6a, the rotation angle θ can be directly and unambiguously deduced. This allows a static angle measurement, i.e. it is not necessary to approach a reference point, but the rotation angle θ can be determined directly. Additional elements which complicate the construction, such as an encoder disc, can be dispensed with.

This determination of the rotation angle θ works in a first rotation angle range. In this, the beam path 8a passes through the refractive structure 8a. In this case, no total reflection occurs in the first rotation angle range, so that in the first rotation angle range, the photodiode 6a actually detects a usable light signal.

In FIG. 1, recesses 13 in the rotary element 4 can also be seen, wherein the rotation angle θ is measured relative to an imaginary connecting line (indicated with dotted lines). The recesses 13 may be used for connection with another element, e.g. an axis of a satellite engine, so as to determine the rotation angle of this element with the sensor 1. Alternatively or additionally, the recesses 13 can be used for the construction of the rotary element 4, as will be explained in more detail below, in particular in connection with the embodiment of FIGS. 3a and 3b.

Figure 2A:
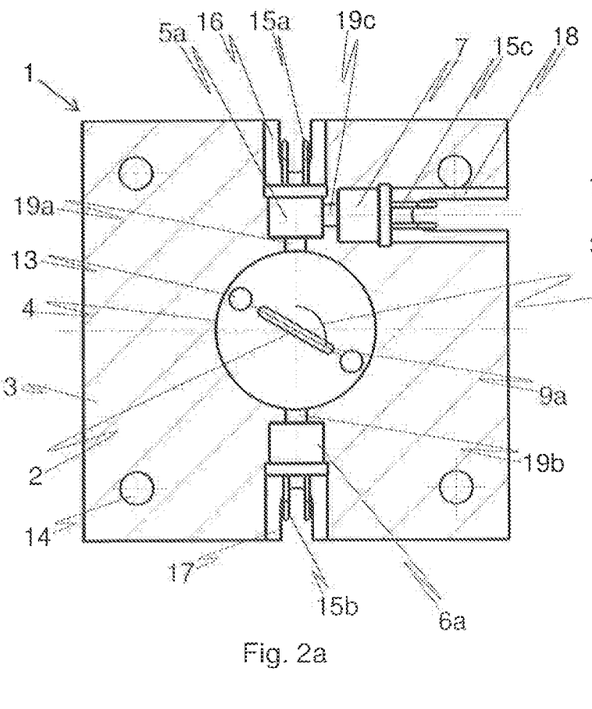
FIG. 2a shows a sectional view through an embodiment of the sensor according to the invention.

FIG. 2a shows a sectional view of an embodiment, or the sensor 1 according to the invention, which differs from that of FIG. 1 primarily in that a reference photodiode 7 is provided as reference light detection means. This serves to detect light emitted by the laser diode 5a before or without this light striking the refractive structure 9a or the rotary element 4. The reference photodiode 7 thus provides a measure of the intensity $I_0$. By setting the light signal detected by the photodiode 6a in relation to the light signal detected by the reference photodiode 7, the transmittance t can be determined irrespective of fluctuations of the light intensity of the laser diode 5a or fluctuations of the intensity which fluctuations can occur, for example, due to supply voltage fluctuations.

In the embodiment of FIG. 2a, the base element 3 is designed as a housing in which the laser diode 5a is arranged in a seat 16, the photodiode 6a in a seat 17 and the reference photodiode 7 in a seat 18. The base element 3 is preferably made of aluminum, but can—especially in accordance with the particular application of the sensor 1—be made of a variety of other materials such as steel, stainless steel or from plastic. The seats 16, 17, 18 can be made by drilling and/or milling.

Figure 2B:
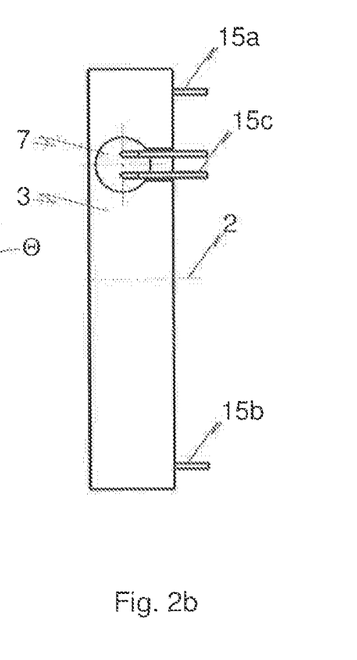
FIG. 2b shows a side view of the sensor of FIG. 2.

The seats 16, 17, 18 are further designed such that electrical connections 15a, 15b, 15c for the laser diode 5a, the photodiode 6a and the reference photodiode 7 can be led to the outside. As can be seen in the side view of FIG. 2b, free ends of the electrical connections 15a, 15b, 15c run parallel to the rotation axis 2.

The base element 3 also has recesses 19a, 19b, 19c. The recess 19a is disposed between the laser diode 5a and the rotary element 4 to enable reliable illumination of the rotary element 4 by the laser diode 5a. The recess 13a also acts as a diaphragm. The recess 13b is arranged between the rotary element 4 and the photodiode 6a, in order to allow the exit of the light from the rotary element 4 and the detection of this light by means of one photodiode 6a, wherein the recess 19b acts as a diaphragm. Finally, the recess 19c is disposed between the laser diode 5a and the reference photodiode 7 to enable the direct detection of light emitted from the laser diode 5a and not passed through the rotary element 4. This measurement provides a measure of $I_0$, wherein the recess 19c can fulfill a diaphragm function.

Finally, holes 14 can be seen in FIG. 2a, which are used for fastening the sensor 1.

Figure 3A:
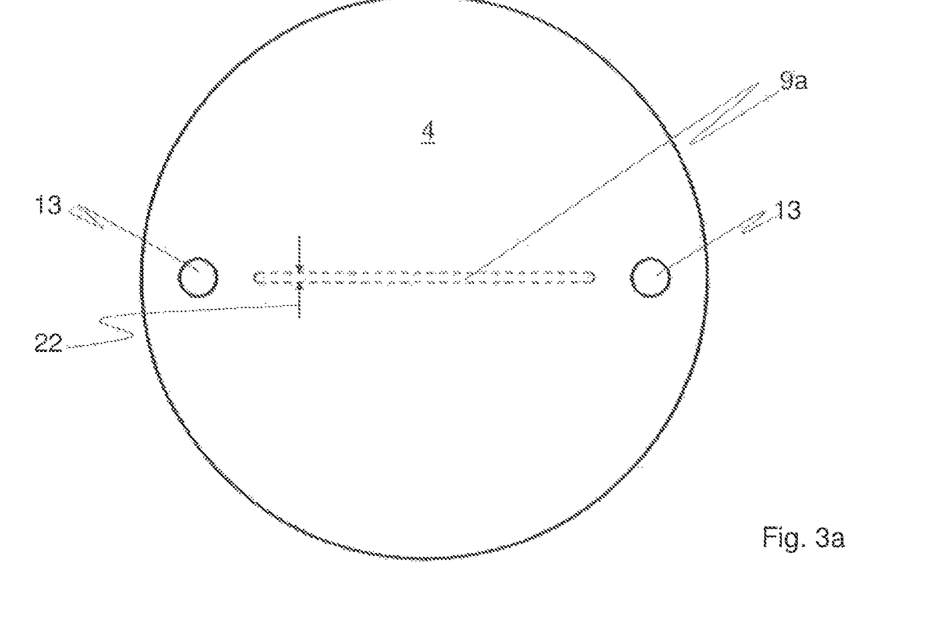
FIG. 3a shows a plan view of a rotary element of a further embodiment of the sensor according to the invention.

The refractive structure 9a may preferably be designed as a recess in the first material, wherein the refractive structure 9a may be produced in particular by etching. FIG. 3a shows a rotary element 4 with a refractive structure 9a produced in this way, which has a width 22. By producing the refractive structure 3a as a recess, in particular by etching, very small widths 22 can be realized, e.g. in the range of 0.5 μm to 500 μm, preferably in the range of 1 to 100 μm, more preferably in the range of 5 μm to 50 μm.

Accordingly, the sensor 1 can also be miniaturized very well. The diameter of the rotary element 4 may typically be a few mm, wherein the lower limit is primarily due to the fact that a mechanically stable connection can be made to the respective element (e.g. a satellite engine axis) whose rotation angle is to be determined in an application.

In this case, the refractive structure 9a may be present only as a recess in the surface of the rotary element 4. However, it is also possible in a simple manner to produce an outwardly closed refractive structure 3a by introducing into the surface of a first part 10 a first section 20 of the refractive structure 9a, preferably etching it, and into the surface of a second part 12 a second section 21 of the refractive structure 9a. Preferably, the sections 20, 21 are formed the same and/or symmetrical.

Figure 3B:
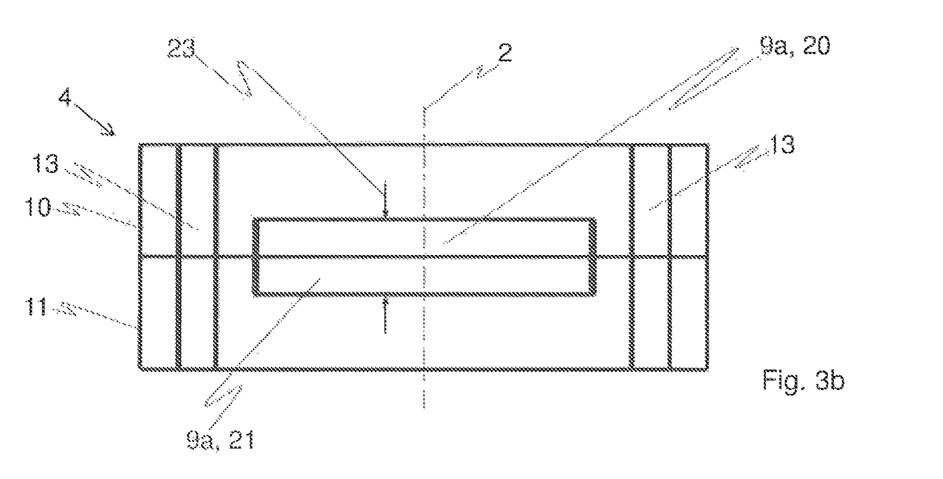

The two parts 10, 11 are then joined together with their mutually facing surfaces, so that the sections 20, 21 now form the closed refractive structure 9a, as illustrated in FIG. 3b. The refractive structure in this case has a height 23 measured along the rotation axis 2, the size of which typically lies in the range from 0.5 μm to 500 μm, preferably in the range from 1 to 100 μm, particularly preferably in the range from 5 μm to 50 μm.

The two parts 10, 11 can be connected in this case, for example, to each other via a profile fit or a suitable adhesive layer. Alternatively or additionally, the connection can also be effected by means of pins (not shown), preferably made of a ceramic material, which are inserted into the recesses 13.

It is advantageous in particular for etching to manufacture the rotary element 4 or the parts 10, 11 from a Si material, in particular from Si wafers, or a glass material, in particular from glass wafers, since in this case proven process technology can be used.

However, it should foe stressed quite generally—without limitation to an exemplary embodiment—that the refraction structure 9a can not only be formed as a recess. For example, it is conceivable that the refractive structure 9a also consists of a Si material or a glass material. In order to specifically influence the refractive index of these materials and thus achieve a desired value for n2, the Si material and/or the glass material provided for the refractive structure 9a can also be selectively doped. Further, it is conceivable to make the refractive structure 9a directly in the rotary element 4 made of a Si material, or a glass material by doping a desired section of the rotary element 4.

Figure 6A:
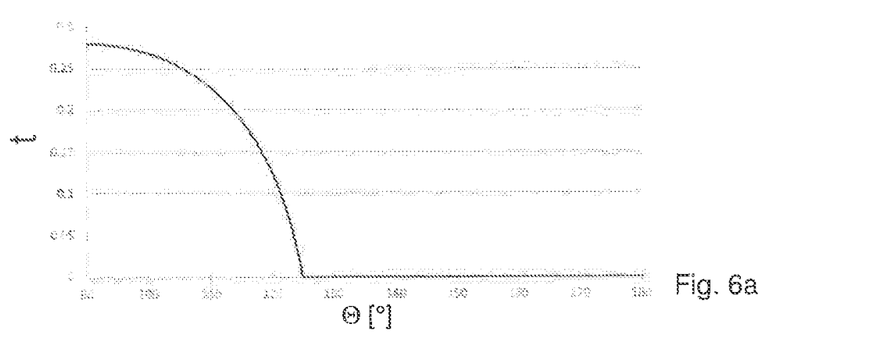
FIG. 6a shows a transmittance depending on a rotation angle for a rectilinear refractive structure.

To illustrate the transfer function, which is generated by means of the refractive structure 3a, a transfer function or a transmittance t for the refractive structure 3a shown in FIG. 3a is shown in FIG. 6a. This refractive structure 9a has a substantially rectilinear profile in the plane of the drawing that is normal to the rotation axis 2. The width 22 of the refractive structure 9a in this plane is 50 μm. The refractive indices are n1=1.75 and n2=1. However, the resulting transfer function or the resulting transmittance t shows a highly nonlinear behavior. Once total reflection occurs, the transmittance t is zero, which in the embodiment of FIG. 6a is the case for θ≈125°. The first rotation angle range ends at the latest here.

Figure 6B:
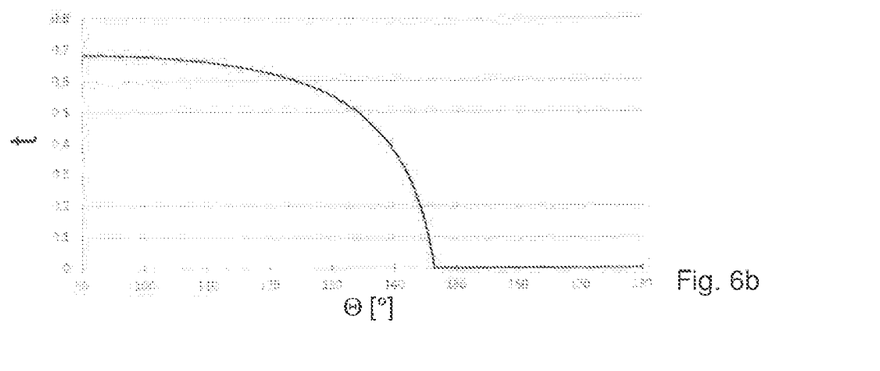
FIG. 6b shows the transmittance as in FIG. 6a, but with a smaller refractive index n1 of a first material of the rotary element.

The angle at which total reflection occurs is essentially determined by n1 and n2. This is illustrated in FIG. 6b, which shows the transfer function and transmittance t for the same parameters as for FIG. 6a, except that n1=1.2 applies. Accordingly, total reflection occurs at θ=146.5°.

Figure 4:
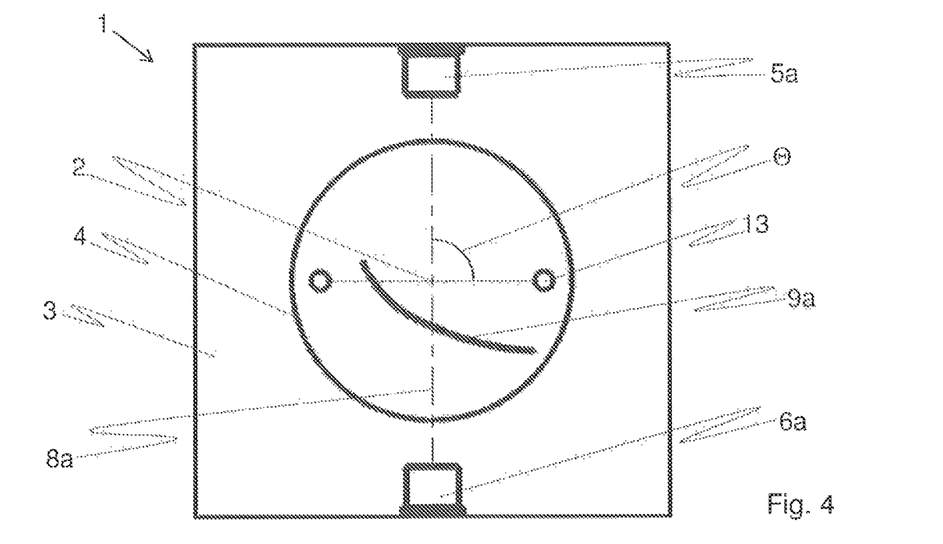
FIG. 4 shows a schematic representation in plan view of another embodiment of the sensor according to the invention with a refractive structure extending in a curved manner.

If a linear or otherwise desired function is to be implemented for the transmittance t or in general for the transfer function, this transfer function can be predetermined and the geometry of the refractive structure 9a to be produced can be recalculated or adapted by means of simulation. For illustration purposes, FIG. 4 shows an embodiment in which the line along which the refractive structure 9a extends in the plane of the drawing is not rectilinear, but curved to generate at least in the first rotation angle range a linear transfer function or a transmittance t linearly dependent on the rotation angle θ.

Figure 5A:
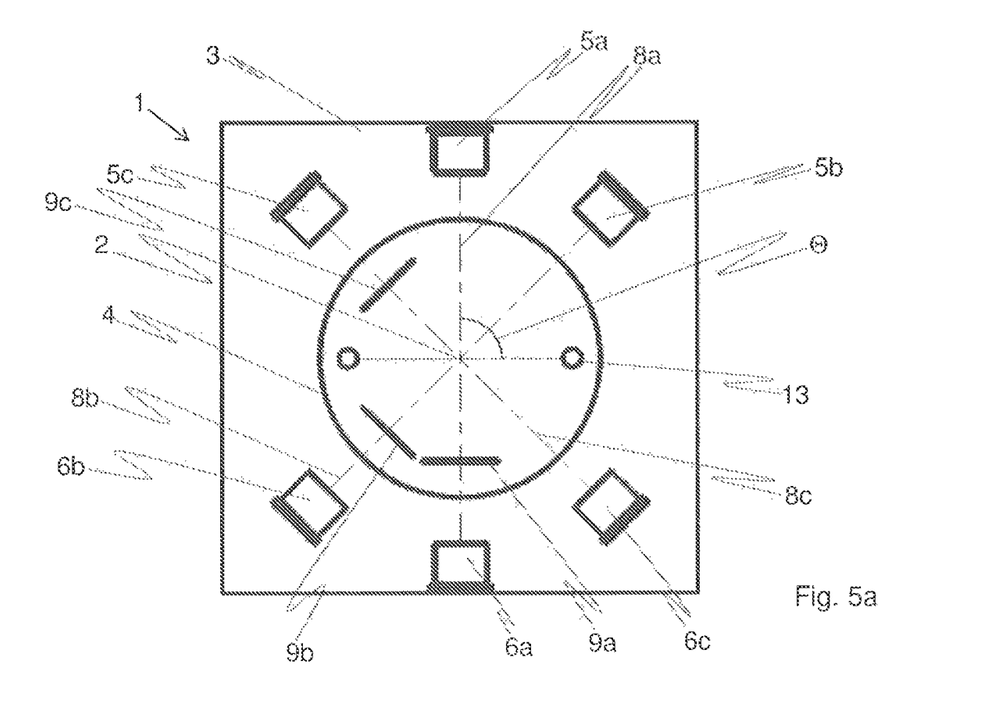
FIG. 5a shows a schematic representation in plan view of another embodiment of the sensor according to the invention with a total of three refractive structures.

FIG. 5a shows an embodiment in which not only the refractive structure 9a, but further refractive structures 9b, 9c are arranged in the rotary element 4. Furthermore, additional light generating means are provided, which are formed in the embodiment shown as laser diodes 5b, 5c. Likewise, additional light detection means are provided, which are designed in the embodiment shown as photodiodes 6b, 6c.

In this case, a beam path 8b of the light emitted by the laser diode 5b and detected by the photodiode 6b extends at least in a certain rotation angle range, which in the exemplary embodiment of FIG. 5a corresponds to the first rotation angle range, through the refractive structure 9b. Analogously, a beam path 8c of the light emitted by the laser diode 5c and detected by the photodiode 6c extends through the refractive structure 9c at least in a certain rotation angle range, which in the exemplary embodiment of FIG. 5a corresponds to the first rotation angle range. In this way, a redundant, measurement can take place in a single sensor 1.

Preferably, the laser diodes 5a, 5b, 5c emit light of different wavelengths or light in different wavelength ranges, in order to minimize or exclude a mutual influence of the measurements of the photodiodes 6a, 6b, 6c. Clearly, the photodiodes 6a, 6b, 6c are sensitive in this case to the wavelengths or the wavelength range of the light emitted by the respectively associated laser diode 5a, 5b, 5c.

In addition to the achievable redundancy, also the range of the measurable rotation angle θ can be expanded by the use of a plurality of refractive structures 9a, 9b, 9c. In the embodiment of FIG. 5a, this would be possible for example in such a way that with increasing rotation angle θ successively the refractive structures 9b and 9a are rotated into the beam path 8b. With knowledge of the transfer functions generated by the refractive structures 9b, 9a, the rotation angle θ can thus be determined in a correspondingly large composite rotation angle range.

Figure 5B:
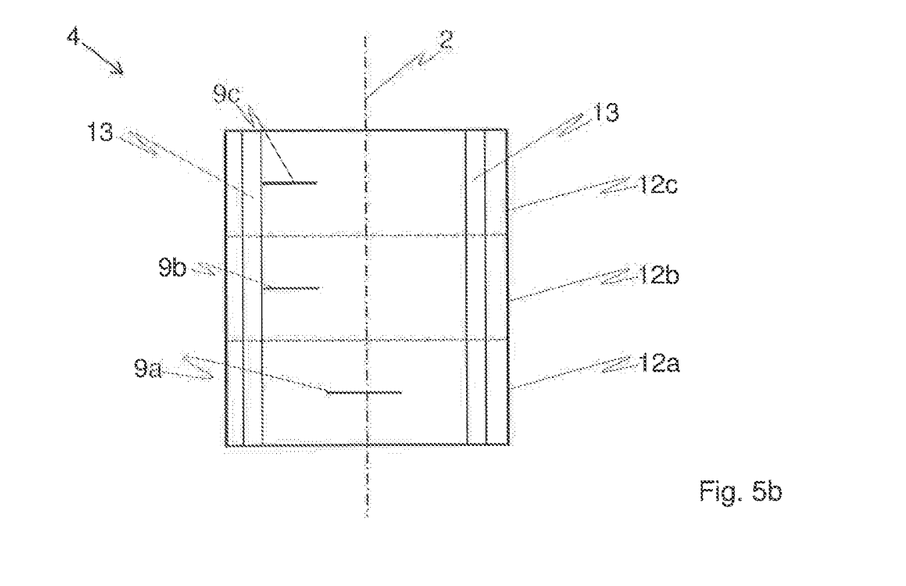
FIG. 5b shows a schematic representation of a sectional view of the rotary element having a multilayer structure.

In order to be able to arrange a plurality of refractive structures 9a, 9b, 9c in the rotary element 4 in a manner which is simple to manufacture, the rotary element 4 can be of multilayer construction. FIG. 5b illustrates such a case, wherein in the plan view of this rotary element 4, an arrangement of the refractive structures 9a, 9b, 9c as in FIG. 5a is obtained. In this case, the rotary element 4 of FIG. 5b consists of a total of three layers 12a, 12b, 12c, which are arranged successively along the rotation axis 2. The layers 12a, 12b, 12c may, for example, be interconnected by a profile fit, by a suitable adhesive layer or by means of pins (not shown), which are arranged in the recesses 1a.

Preferably, the laser diodes 5a, 5b, 5c and the photodiodes 6a, 6b, 6c, as viewed along the rotation axis 2, are arranged in succession, so that a respective one of the layers 12a, 12b, 12c is illuminated by each of the laser diode 5a, 5b, 5c and a beam path (not shown) extends in each layer 12a, 12b, 12c.

LIST OF REFERENCE NUMERALS

1 Sensor
2 Rotation axis
3 Base element
4 Rotary element
5a, 5b, 5c Laser diode
6a, 6b, 6c Photodiode
7 Reference photodiode
8a, 8b, 8c Beam path
9a, 9b, 9c Refractive structure
10 First part
11 Second part
12a, 12b, 12c Layer of the rotary element
13 Recess in the rotary element
14 Hole
15a, 15b, 15c Electrical connection
16 Seat of laser diode
17 Seat of photodiode
18 Seat of reference photodiode
19a, 19b, 19c Recess in the base element
20 First section of the refractive structure
21 Second section of the refractive structure
22 Width of the refractive structure
23 Height of the refractive structure
θ Rotation angle
t Degree of transmission

The invention claimed is:

1. A sensor for determining a rotation angle (θ) about a rotation axis, the sensor comprising:
 a rotary element mounted in a base element so as to be rotatable about the rotation axis;
 said rotary element being made from a first material having a first refractive index n1 and, as viewed along the rotation axis, is constructed from several layers;
 at least one light generating device fixedly arranged relative to the base element;
 at least one light detection device fixedly arranged relative to the base element and configured to detect a light signal emitted by the at least one light generating device and that passes through the rotary element along at least one beam path;
 at least one refractive structure arranged in each layer of the several layers of the rotary element and having a second refractive index n2,
 wherein n2≠n1, and
 wherein the at least one beam path extends at least in a first rotation angle range through the at least one refractive structure in order to be able to assign a specific rotation angle (θ) to the light signal detected by the at least one light detection device at least in the first rotation angle range.

2. The sensor of claim 1, wherein n2<n1.

3. The sensor of claim 1, wherein the at least one light detection device is configured to determine a light intensity.

4. The sensor of claim 1, further comprising at least one reference light detection device configured to detect light emitted by the at least one light generating device before this light impinges on the at least one refractive structure.

5. The sensor of claim 1, further comprising at least one reference light detection device configured to detect light emitted by the at least one light generating device before this light impinges on the rotary element.

6. The sensor of claim 1, wherein the at least one light generating device and the at least one light detection device are arranged opposite to each other, wherein the rotation axis is arranged between the at least one light generating device and the at least one light detection device.

7. The sensor of claim 1, wherein the at least one refractive structure is one of:
formed by a recess in the first material; and
etched into the first material.

8. The sensor of claim 1, wherein the respective at least one refractive structure in the several layers are arranged such that respective beam paths extend in different rotation angle ranges through the respective refractive structures.

9. The sensor of claim 1, wherein the respective at least one refractive structure in the several layers are arranged such that respective beam paths extend in different rotation angle ranges through the respective refractive structures and that overlap in sections.

10. The sensor of claim 1, wherein the least one light generating device is configured to generate light for one of:
a plurality of the several layers; or
all of the several layers.

11. The sensor of claim 1, wherein the at least one light detection device is configured to detect light for one of:
a plurality of the several layers; or
all of the several layers.

12. The sensor of claim 1, wherein the rotary element comprises a first part and a second part joined to the first part, wherein the first part has a first section of the at least one refractive structure and the second part has a second section of the at least one refractive structure, and that the first section and the second section are connected so as to form the at least one refractive structure.

13. The sensor of claim 1, wherein one of:
the least one light generating device comprises a plurality of light generating devices configured to emit light having different wavelengths;
the least one light detecting device comprises a plurality of light detecting devices configured to detect light having different wavelengths; or
the at least one light detection device is configured to detect wavelength-dispersive light.

14. The sensor of claim 1, wherein the first material is one of:
a Si material; or
a glass material.

15. The sensor of claim 1, wherein the at least one light generating device is at least one laser diode.

16. The sensor of claim 1, wherein the at least one light detection device is at least one photodiode.

17. The sensor of claim 1, further comprising at least one reference light detection device that comprises at least one photodiode.

18. The sensor of claim 1, wherein the at least one refractive structure extends along one of:
a line in a plane normal to the rotation axis; and
a zero-curvature line in a plane normal to the rotation axis.

19. The sensor of claim 18, wherein one of:
the line has such a curvature that at least in the first rotation angle range a certain transfer function is provided between a light signal detectable by the at least one light detection device and the rotation angle ($\theta$); or
the line has such a curvature that at least in the first rotation angle range a linear transfer function is provided between a light signal detectable by the at least one light detection device and the rotation angle ($\theta$).

20. A device comprising:
at least one sensor according to claim 1; and
a memory configured to store, at least for the first rotation angle range, a transfer function generated by the at least one refractive structure between the light signal detectable by the at least one light detection device and the rotation angle ($\theta$).

21. A satellite comprising:
a satellite engine; and
a sensor according to claim 1.

* * * * *